United States Patent
Mayumi

(10) Patent No.: US 7,945,156 B2
(45) Date of Patent: May 17, 2011

(54) CAMERA AND LENS ASSEMBLY

(75) Inventor: Kazuya Mayumi, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 184 days.

(21) Appl. No.: 12/324,416

(22) Filed: Nov. 26, 2008

(65) Prior Publication Data

US 2009/0136228 A1    May 28, 2009

(30) Foreign Application Priority Data

Nov. 28, 2007  (JP) ................................. 2007-307727

(51) Int. Cl.
G03B 17/02    (2006.01)
(52) U.S. Cl. ......... 396/535; 396/529; 348/373; 348/374
(58) Field of Classification Search .................. 396/529, 396/535; 348/374
See application file for complete search history.

(56) References Cited

U.S. PATENT DOCUMENTS

| | | | | |
|---|---|---|---|---|
| 3,696,725 A | * | 10/1972 | Lange | ............................ 359/823 |
| 5,181,057 A | * | 1/1993 | Takagi et al. | ................... 396/20 |
| 5,555,062 A | * | 9/1996 | Pearson et al. | .................... 396/6 |
| 5,768,649 A | * | 6/1998 | Pearson | ......................... 396/529 |
| 2004/0076424 A1 | | 4/2004 | Terada et al. | ................. 396/529 |
| 2005/0185951 A1 | | 8/2005 | Terada et al. | ................. 396/535 |
| 2009/0050795 A1 | * | 2/2009 | Ishikawa | ....................... 250/239 |

FOREIGN PATENT DOCUMENTS

| | | |
|---|---|---|
| JP | 2004-12531 A | 1/2004 |
| JP | 2004-12532 A | 1/2004 |
| JP | 2004-13006 A | 1/2004 |
| JP | 2004-21115 A | 1/2004 |
| JP | 2004-22594 A | 1/2004 |
| JP | 2005-156854 A | 6/2005 |
| JP | 2006-30419 A | 2/2006 |

* cited by examiner

*Primary Examiner* — Clayton E Laballe
*Assistant Examiner* — Bret Adams
(74) *Attorney, Agent, or Firm* — Sughrue Mion, PLLC

(57) ABSTRACT

A camera which has a compact configuration, can be easily assembled and has excellent appearance, and an assembling method thereof are provided. An outer cover body of the camera is formed in a tubular shape. The outer cover body has: a lens attachment portion for attaching the lens unit; a lens opening portion through which a lens barrel of the lens unit attached to the lens attachment portion is inserted; and a hole through which the lens unit can pass, and the lens unit is housed inside the outer cover body and is attached to the lens attachment portion.

11 Claims, 7 Drawing Sheets

CAMERA AND LENS ASSEMBLY

BACKGROUND OF THE INVENTION

1. Field of the Invention

The present invention relates to a camera and an assembling method thereof, and more particularly, to a camera whose outer cover body is formed in a tubular shape by extrusion, and an assembling method thereof.

2. Description of the Related Art

Camera outer covers are generally includes a front cover and a rear cover, and are formed so as to be separable into the front and rear portions. A lens unit is attached thereto by fixing the lens unit to a frame that is housed inside the outer cover, or fixing the lens unit to the front cover (for example, Japanese Patent Application Laid-Open Nos. 2005-156854, 2006-030419, 2004-012531, and 2004-012532).

When the outer cover is formed so as to be separable into the front and rear portions as in the conventional camera described above, there is such a disadvantage that a seam is formed in a joint between the front cover and the rear cover and appearance is impaired (sleek and unified appearance cannot be obtained).

On the other hand, when the outer cover body is formed in a tubular shape, the seam between the front and rear portions can be removed (so-called seamless design), and excellent appearance that is sleek and unified can be obtained. There is also such an advantage that such a tubular outer cover body can be easily produced by extrusion.

SUMMARY OF THE INVENTION

However, when the outer cover body is formed in a tubular shape, there is such a disadvantage that assembly requires more work since parts can be inserted thereinto only from both end openings. Also, it is necessary to ensure a certain size of opening such that parts can be inserted thereinto. As a result, there occurs such a problem that the camera is increased in thickness. In particular, a collapsible lens unit has a large width in the front-back direction, and thus, there is such a disadvantage that the thickness of the camera is increased beyond necessity when the collapsible lens unit is to be inserted from the both end openings.

The present invention has been made in view of the aforementioned circumstances, and aims to provide a camera which has a compact configuration, can be easily assembled, and has excellent appearance, and an assembling method thereof.

In order to achieve the above object, according to a first aspect, a camera assembled by attaching a lens unit to inside of a hollow outer cover body that is formed with both top and bottom or right and left end surfaces having openings, includes: a lens attachment portion for attaching the lens unit, which is formed in the outer cover body; a lens opening portion formed in the outer cover body, through which a lens barrel of the lens unit attached to the lens attachment portion is inserted; a hole formed in a surface of the outer cover body other than the surfaces where the openings are formed, through which the lens unit can pass so that the lens unit is housed inside the outer cover body and is attached to the lens attachment portion.

With the camera according to the first aspect, the hole through which the lens unit can pass is formed in a surface other than the both end opening surfaces in the outer cover body, and the lens unit is inserted into the outer cover body through the hole. Therefore, it is not necessary to increase the size of the both end openings beyond necessity, and the camera can be reduced in size. In addition, unified appearance of the camera is not impaired.

In order to achieve the above object, according to a second aspect, in the camera according to the first aspect, a width in a front-back direction of the openings formed in the both top and bottom or right and left end surfaces of the outer cover body is formed smaller than a width in a front-back direction of the lens unit, and the lens unit is attached to the lens attachment portion with a top end portion of the lens barrel projecting from the lens opening portion.

With the camera according to the second aspect, the width in the front-back direction of the opening formed in the outer cover body is formed smaller than the width in the front-back direction of the lens unit, and the lens unit is attached to the lens attachment portion so that the top end portion of the lens barrel projects from the lens opening portion. Accordingly, the thickness of the outer cover body can be further reduced.

In order to achieve the above object, according to a third aspect, in the camera according to the first or second aspect, the hole is formed in a back surface of the outer cover body, and a monitor is mounted on the hole.

With the camera according to the third aspect, the hole through which the lens unit is inserted is formed in the back surface of the outer cover body, and the monitor is mounted on the hole. That is, the lens unit is inserted into the outer cover by using the hole on which the monitor is to be mounted. Accordingly, the lens unit can be inserted into the outer cover without impairing appearance of the camera at all.

In order to achieve the above object, according to a fourth aspect, in the camera according to the third aspect, the hole is formed at least larger than an outer periphery of the lens unit such that the lens unit can be inserted perpendicularly with respect to the back surface of the outer cover body.

With the camera according to the fourth aspect, the hole through which the lens unit is inserted is formed such that the lens unit can be inserted perpendicularly with respect to the back surface of the outer cover body. Accordingly, the lens unit can be smoothly inserted into the outer cover body, so as to more easily perform the assembly.

In order to achieve the above object, according to a fifth aspect, in the camera according to the fourth aspect, the hole is formed facing the lens attachment portion such that the lens unit attached to the lens attachment portion can be perpendicularly pulled out.

With the camera according to the fifth aspect, the hole through which the lens unit is inserted is formed facing the lens attachment portion such that the lens unit attached to the lens attachment portion can be perpendicularly pulled out. Accordingly, the lens unit can be attached to the lens attachment portion by perpendicularly inserting the lens unit down from the hole, so as to further facilitate the assembly of the lens unit.

In order to achieve the above object, according to a sixth aspect, the camera according to any one of the first to fifth aspects, further includes: a decorative member attached to an outer peripheral surface of the front surface of the outer cover body; and a fastening member which fastens the lens unit attached to the lens attachment portion to the decorative member by holding the outer cover body between the lens unit and the decorative member so as to fix the lens unit to the lens attachment portion.

With the camera according to the sixth aspect, the decorative member is attached to the outer peripheral surface of the front surface of the outer cover body, and the lens unit is fastened and fixed to the decorative member by the fastening member so as to hold the outer cover body between the lens unit and the decorative member, so that the lens unit is fixed to the lens attachment portion. Accordingly, it is not necessary to separately provide a member such as a screw hole for fixing the lens unit to the outer cover body, and man-hours required for producing the outer cover body can be thereby reduced.

In order to achieve the above object, according to a seventh aspect, in the camera according to the sixth aspect, the decorative member is a lens ring, which is attached to an outer periphery of the lens opening portion.

With the camera according to the seventh aspect, the decorative member is the lens ring, which is attached to the outer periphery of the lens opening portion. By attaching the lens ring, even when the top end portion of the lens barrel is provided projecting from the front surface of the outer cover body, the projecting portion can be absorbed by the lens ring. The front surface of the outer cover body can be thereby made to look flat without giving a sense of incongruity. Accordingly, more excellent appearance of the camera can be obtained.

In order to achieve the above object, according to an eighth aspect, the camera according to the seventh aspect, further includes: a lens ring attachment hole formed penetrating the front surface of the outer cover body around the lens opening portion; and a pin to be inserted through the lens ring attachment hole, which is formed in a back surface of the lens ring, and in the camera the lens unit attached to the lens attachment portion is perpendicularly screwed to the pin by a screw and fixed.

With the camera according to the eighth aspect, the lens ring is attached to the front surface of the outer cover body by inserting the pin that is formed in the back surface of the lens ring through the lens ring attachment hole that is formed in the front surface of the outer cover body. The lens unit is perpendicularly screwed to the pin of the lens ring by the screw and is thereby fixed. Accordingly, the lens ring can be easily attached to a predetermined position, and the lens unit can be easily fixed to the lens ring.

In order to achieve the above object, according to a ninth aspect, in the camera according to any one of the first to fifth aspects, an outer periphery of the lens opening portion is formed projecting with a predetermined width by half punching.

With the camera according to the ninth aspect, the outer periphery of the lens opening portion is formed projecting with a predetermined width by half punching. Accordingly, even when the top end portion of the lens barrel is provided projecting from the front surface of the outer cover body, the projecting portion can be absorbed by the portion made to project by half punching. The front surface of the outer cover body can be thereby made to look flat without giving a sense of incongruity. Accordingly, more excellent appearance of the camera can be obtained.

In order to achieve the above object, according to a tenth aspect, in the camera according to the ninth aspect, the surface formed projecting is given surface decoration.

With the camera according to the tenth aspect, the surface made to project by half punching is given surface decoration (for example, diamond cut processing, hairline processing, mirror surface processing or the like). Accordingly, more excellent appearance of the camera can be obtained.

In order to achieve the above object, according to an eleventh aspect, a method of assembling a camera assembled by attaching a lens unit to inside of a hollow outer cover body that is formed with both top and bottom or right and left end surfaces having openings, includes: forming a hole through which the lens unit can pass in a surface of the outer cover body other than the surfaces where the openings are formed; housing the lens unit inside the outer cover body through the hole; and attaching the lens unit to a lens attachment portion formed in a front surface of the outer cover body.

With the method according to the eleventh aspect, the lens unit can be inserted into the outer cover body through the hole formed in a surface other than the both end opening surfaces of the outer cover body. Accordingly, it is not necessary to increase the size of the both end openings beyond necessity, and the camera can be reduced in size. Also, unified appearance of the camera is not impaired.

In order to achieve the above object, according to a twelfth aspect, in the method of assembling a camera according to the eleventh aspect, the hole is formed in a back surface of the outer cover body facing the lens attachment portion as a hole on which a monitor is to be mounted such that the lens unit attached to the lens attachment portion can be perpendicularly pulled out, and the lens unit is attached to the lens attachment portion by perpendicularly inserting the lens unit down from the hole.

With the method according to the twelfth aspect, the lens unit can be attached to the lens attachment portion by perpendicularly inserting the lens unit down from the hole. Accordingly, the lens unit can be attached by inserting the lens unit down in only one direction, and the lens unit can be more easily attached.

In order to achieve the above object, according to a thirteenth aspect, the method of assembling a camera according to the twelfth aspect, further includes: attaching a lens ring to an outer peripheral surface of the front surface of the outer cover body; and fastening the lens unit attached to the lens attachment portion to the lens ring by a fastening member by holding the outer cover body between the lens unit and the lens ring so as to fix the lens unit to the lens attachment portion.

With the method according to the thirteenth aspect, the lens ring is attached to the outer peripheral surface of the front surface of the outer cover body, and the lens unit is fastened and fixed to the lens ring by the fastening member so as to hold the outer cover body between the lens unit and the lens ring, so that the lens unit is fixed to the lens attachment portion. Accordingly, it is not necessary to separately provide a member such as a screw hole for fixing the lens unit to the outer cover body, and man-hours required for producing the outer cover body can be thereby reduced.

According to the present invention, a compact configuration can be obtained, and the assembly can be easily performed. In addition, excellent appearance of the camera can be obtained.

DETAILED DESCRIPTION OF THE PREFERRED EMBODIMENT

In the following, preferable embodiment of a camera and an assembling method thereof according to the present invention will be described with reference to the accompanying drawings.

Figure 1:
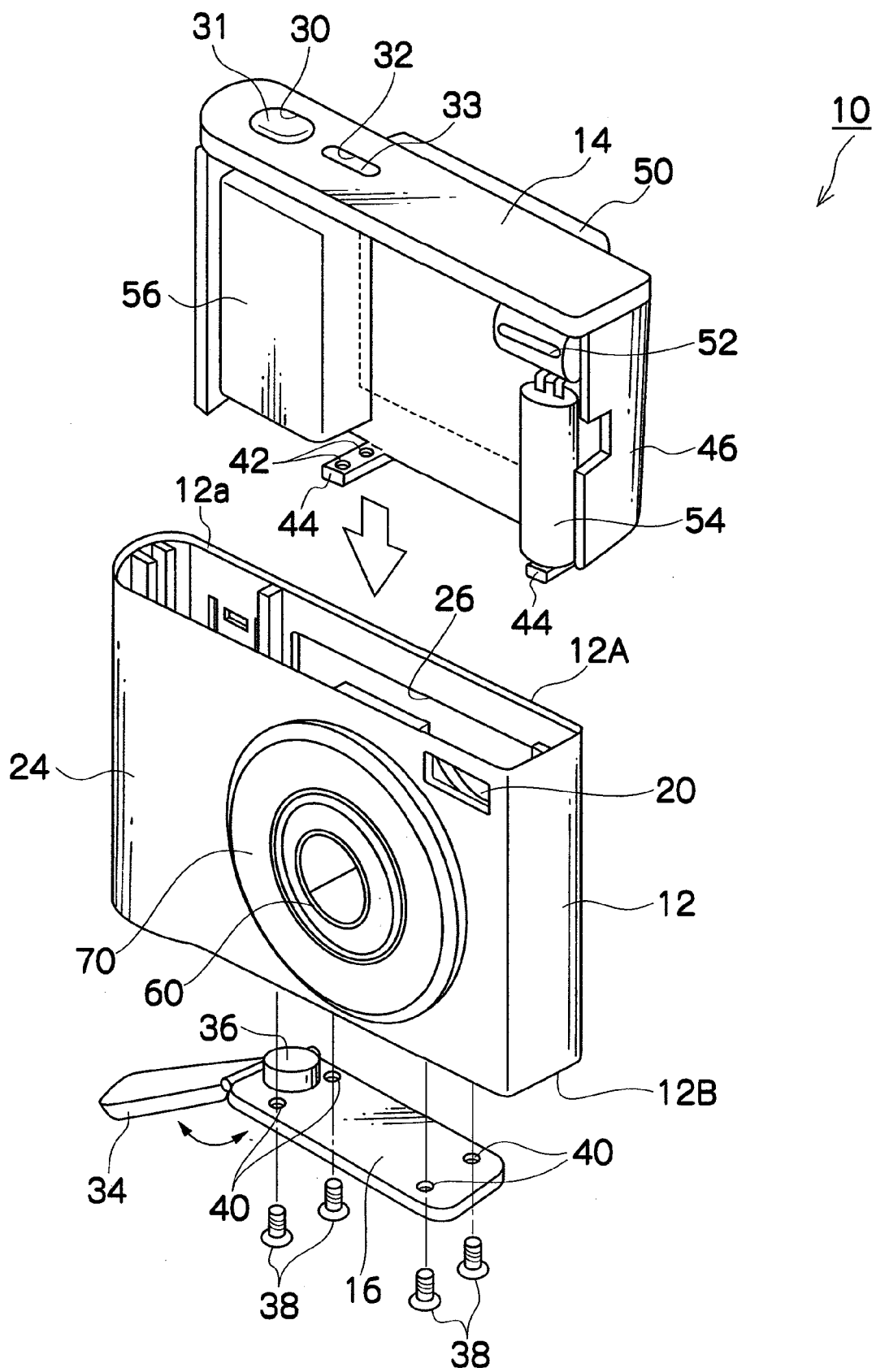
FIG. 1 is an exploded perspective view illustrating a camera assembly structure to which the present invention is applied.

FIG. 1 is an exploded perspective view illustrating a camera assembly structure to which the present invention is applied. A camera 10 is a digital camera which electronically records a still image.

As shown in FIG. 1, an exterior of the camera 10 includes an outer cover body 12 that is formed in a tubular shape, a top cover 14 attached to a top surface opening portion 12A of the outer cover body 12, and a bottom cover 16 attached to a bottom surface opening portion 12B. The camera 10 is assembled, after attaching a lens unit to the inside of the outer cover body 12, by inserting an inner frame 46 to which various electronic parts such as an LCD monitor 50, an electronic flash 52 and a substrate are attached from the top surface opening portion 12A of the outer cover body 12, and closing the top surface opening portion 12A and the bottom surface opening portion 12B by the top cover 14 and the bottom cover 16.

Figure 2:
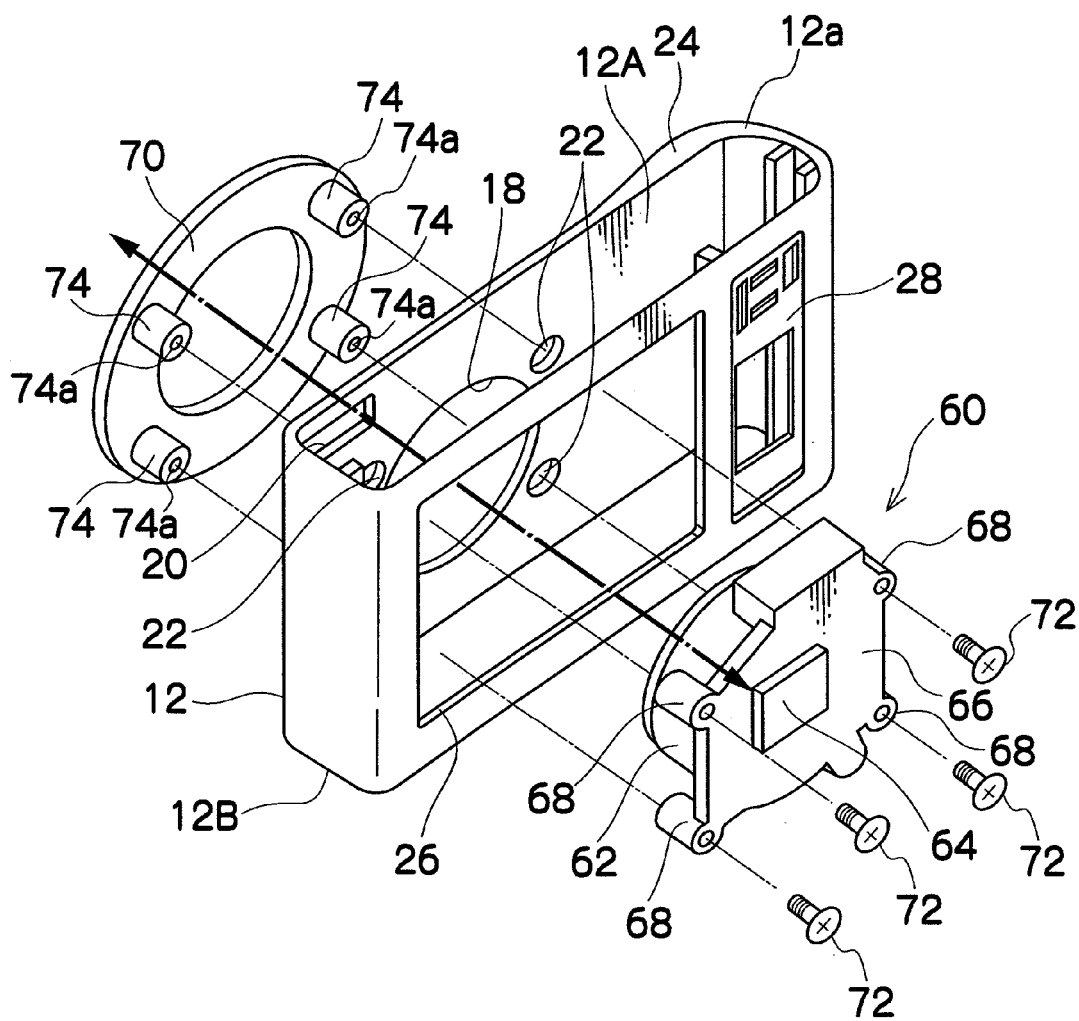
FIG. 2 is a perspective view illustrating an attaching structure of a lens unit.

The outer cover body 12 is formed into a substantially rectangular flat tubular shape that is thin in the front-back direction. A lens opening portion 18 (see FIG. 2), an electronic flash opening portion 20, lens ring attachment holes 22 (see FIG. 2), and a grip 24 are formed in a front surface of the outer cover body 12. Also, a monitor opening portion 26 and an operation panel attachment portion 28 are formed in a back surface of the outer cover body 12 as shown in FIG. 2.

The outer cover body 12 is formed into a predetermined shape by forming a basic framework by extruding metal (for example, aluminum alloy, magnesium alloy, stainless steel or the like), and giving required processing (punching of the lens opening portion or the like) to the basic framework. Therefore, the outer cover body 12 has a uniform sectional shape along an opening direction (direction orthogonal to the both end opening surfaces).

The lens opening portion 18 is an opening for a lens, and is formed in a position slightly shifted to the right from the center of the front surface of the outer cover body 12. A lens unit 60 is attached to the inside of the lens opening portion 18. A lens barrel of the lens unit 60 is protruded from the front surface of the outer cover body 12 through the lens opening portion 18. Therefore, the lens opening portion 18 is formed into a shape corresponding to the outline of the lens barrel and is formed in a circular shape.

The electronic flash opening portion 20 is an opening for an electronic flash, and is formed in an upper right position of the lens opening portion 18. The electronic flash is disposed inside the electronic flash opening portion 20. Although not shown, a resin window member is attached to the electronic flash opening portion 20 at the time of assembling the camera 10.

The lens ring attachment holes 22 are circular holes for attaching a lens ring 70, and are concentrically disposed at four positions around the lens opening portion 18 as shown in FIG. 2. As described below, the lens ring 70 is positioned and attached to a predetermined position of the front surface of the outer cover body 12 by inserting four columnar pins 74 that are formed in a back surface of the lens ring 70 through the lens ring attachment holes 22, respectively.

The grip 24 is formed along the vertical direction on the left end of the front surface of the outer cover body 12. The grip 24 is integrally formed with the outer cover body 12 by allowing the outer cover body 12 to have a predetermined thickness.

The monitor opening portion 26 is an opening for a monitor, and is formed facing the lens opening portion 18 as shown in FIG. 2. The monitor is attached to the inside of the monitor opening portion 26. As described below, the lens unit 60 is housed inside the outer cover body 12 by using the monitor opening portion 26. Although not shown, a resin window member for protecting the monitor surface is attached to the monitor opening portion 26 at the time of assembling the camera 10.

The operation panel attachment portion 28 is an attachment portion of an operation panel (now shown) having various operation buttons such as a zoom button, a menu button and a cross button. The operation panel attachment portion 28 is provided in parallel with the monitor opening portion 26 in a right end position of the back surface of the outer cover body 12.

The top cover 14 is formed corresponding to the shape of the top surface opening portion 12A of the outer cover body 12, and is formed of a resin in a plate-like shape having a predetermined thickness. In the top cover 14, a shutter button opening portion 30 and a power button opening portion 32 are formed in parallel in the lateral direction in the vicinity of the left end. A shutter button 31 and a power button 33 are respectively attached to the shutter button opening portion 30 and the power button opening portion 32 at the time of assembling the camera 10.

A predetermined step portion 12a is fabricated and formed in the rim of the top surface opening portion 12A of the outer cover body 12. The top cover 14 is fitted into the step portion 12a, and is thereby attached to the top surface of the outer cover body 12.

Also, as shown in FIG. 1, at the time of the attachment to the outer cover body 12, the top cover 14 is attached to the inner frame 46, and the top cover 14 together with the inner frame 46 is attached to the outer cover body 12. The top cover 14 is screwed and attached to the inner frame 46 by an unillustrated screw from inside.

The bottom cover 16 is formed of a resin in a plate-like shape having a predetermined thickness. A battery lid 34 is swingably attached to the bottom cover 16 via a hinge. The bottom cover 16 is integrated with the battery lid 34 and is attached to the bottom surface opening portion 12B of the outer cover body 12. Accordingly, the integrated bottom cover 16 and battery lid 34 is formed into a shape corresponding to the shape of the bottom surface opening portion 12B of the outer cover body 12.

Also, in the bottom cover 16, a tripod screw hole 36 is integrally formed, and attachment holes 40 for screwing the bottom cover 16 to the inner frame 46 by screws 38 are formed at the four corners. The bottom cover 16 is screwed to the inner frame 46 by inserting the screws 38 through the attachment holes 40 formed at the four corners and screwing the screws 38 with screw holes 42 formed in the inner frame 46.

Also, a predetermined step portion 12b is fabricated and formed in the rim of the bottom surface opening portion 12B of the outer cover body 12 in a similar manner to the top surface opening portion 12A. The bottom cover 16 and the battery lid 34 are fitted into the step portion, and are thereby attached to the bottom surface of the outer cover body 12 (see FIG. 4).

Also, the bottom cover 16 is screwed to the inner frame 46 by the screws 38, so that the top cover 14 and the bottom cover 16 are attached to the outer cover body 12 by holding the outer cover body 12 from top and bottom.

The inner frame 46 is formed into a predetermined shape by pressing a metal plate such as stainless steel and aluminum alloy. As described above, various electronic parts such as the LCD monitor 50, the electronic flash 52, a main capacitor 54, and the substrate (not shown) are attached to the inner frame 46. Accordingly, an attachment portion (not shown) for attaching the electronic parts by a screw or the like is formed in the inner frame 46.

Reference numeral 56 designates a battery, which is housed in a battery chamber formed on the right end of the inner frame 46. When the battery lid 34 provided in the bottom cover 16 is opened, the battery chamber is in communication therewith, and the battery 56 can be housed therein. Although not shown, a media slot is provided in parallel with the battery chamber, and a memory card is mounted in the media slot. The battery lid 34 opens and closes the media slot and the battery chamber.

Also, a pair of projecting pieces 44 is formed to be folded at a right angle in a lower side portion of the inner frame 46. The screw holes 42 for screwing the bottom cover 16 by the screws 38 are formed in the projecting pieces 44.

Although not shown, a top cover attachment portion for attaching the top cover 14 is formed in an upper side portion of the inner frame 46. The top cover 14 is screwed and fixed to the top cover attachment portion.

FIG. 2 is a perspective view illustrating an attaching structure of the lens unit 60. As shown in FIG. 2, the lens unit 60 is housed inside the outer cover body 12 by using the monitor opening portion 26 that is formed in the back surface of the outer cover body 12. The lens unit 60 is screwed to the lens ring 70 by screws 72, and is thereby fixed to the outer cover body 12.

The lens unit 60 includes a collapsible lens device 62 and a CCD 64, which are respectively attached to a supporting plate 66 and are thereby integrated together. That is, the lens device 62 is attached to a front surface of the supporting plate 66 and the CCD 64 is attached to a back surface thereof, so that they are integrated together. A motor or the like for driving the lens device 62 is also attached to the supporting plate 66.

As described above, the lens unit 60 is screwed to the lens ring 70 by the screws 72, and is thereby fixed to the outer cover body 12.

The lens ring 70 is formed into an annular shape having a predetermined thickness, and is attached to the front surface of the outer cover body 12 so as to enclose the periphery of the lens opening portion 18 formed in the front surface of the outer cover body 12.

The lens ring 70 is attached by inserting the four columnar pins 74 that are perpendicularly provided on the back surface of the lens ring 70 through the four lens ring attachment holes 22 that are formed in the front surface of the outer cover body 12. The lens ring 70 is thereby attached to a predetermined position of the front surface of the outer cover body 12. Since the four pins 74 are respectively inserted through the lens ring attachment holes 22 formed in the outer cover body 12, the four pins 74 and the lens ring attachment holes 22 are respectively provided at positions corresponding to each other.

When the lens ring 70 is attached to the outer cover body 12, the four pins 74 are disposed projecting inside the outer cover body 12. The lens unit 60 is attached to the outer cover body 12 by screwing four positions of the supporting plate 66 to the four pins 74 by the screws 72. That is, the four pins 74 function as the attachment portion of the lens unit 60 (lens attachment portion). Four screwing portions 68 are formed in the supporting plate 66 corresponding to the four pins 74 formed in the lens ring 70. Each of the screwing portions 68 is formed in a tubular shape, and is disposed along an optical axis. The lens unit 60 is screwed to the lens ring 70 by inserting the screws 72 through inner peripheral portions of the screwing portions 68 and screwing the screws 72 with screw holes 74a formed in top end surfaces of each pin 74 of the lens ring 70. The lens unit 60 screwed to the lens ring 70 as described above is attached to the outer cover body 12 by holding the front surface of the outer cover body 12 between the lens unit 60 and the lens ring 70 (holding the front surface of the outer cover body 12 between the back surface of the lens ring 70 and a top end surface of a fixed barrel located at the outermost periphery of the lens barrel that constitutes the lens device 62).

Figure 4:
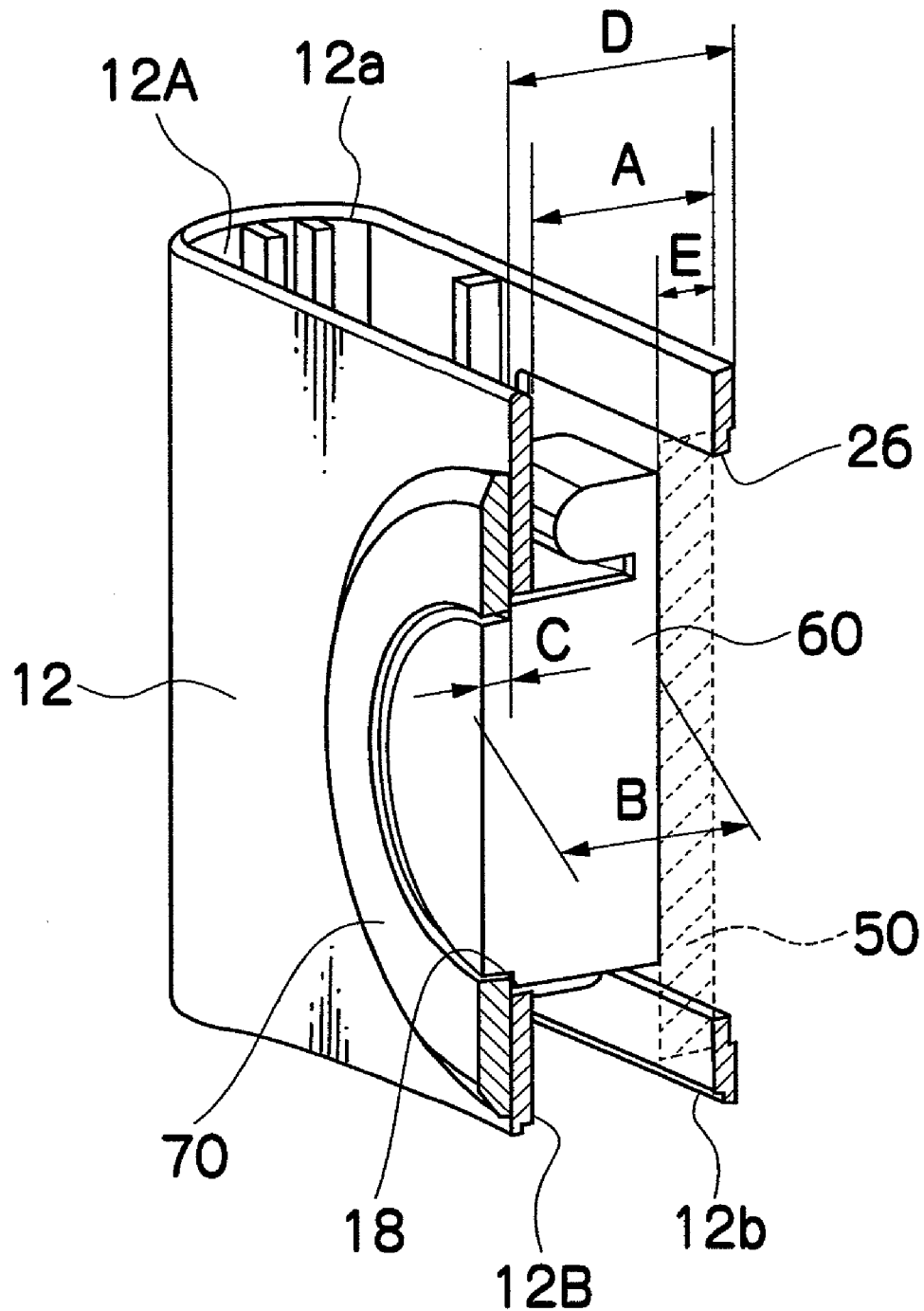
FIG. 4 is a sectional perspective view of an outer cover body to which a lens unit is attached.

The lens unit 60 attached to the outer cover body 12 as described above is attached so that a top end portion of the lens barrel projects a predetermined amount (C) from the front surface of the outer cover body 12 as shown in FIG. 4. The lens ring 70 absorbs the projecting amount of the lens barrel. That is, the lens ring 70 is formed to have the same thickness C as the projecting amount C of the lens barrel. As a result, the top end surface of the lens barrel is located on the same surface as a front surface of the lens ring 70 when the lens barrel is in a collapsed state. Accordingly, the front surface of the camera 10 can be made to look flat without giving a sense of incongruity.

As described above, the lens unit 60 is inserted into the outer cover body 12 through the monitor opening portion 26. Therefore, the monitor opening portion 26 is formed to be large enough for the lens unit 60 to pass therethrough.

In the camera 10 of the present embodiment, the monitor opening portion 26 is formed to have such a size that the lens unit 60 can be perpendicularly inserted with respect to the back surface of the outer cover body 12. To be more specific, the monitor opening portion 26 is formed larger than a rear projection size of the lens unit 60 excluding a movable portion such as a flexible cable.

The lens unit 60 can be more easily inserted as the monitor opening portion 26 becomes larger. However, it is necessary to increase the size of the LCD monitor 50 in this connection, and the camera itself needs to be increased in dimensions. Accordingly, it is preferable that the monitor opening portion 26 has a minimum size required to perpendicularly insert the lens unit 60.

Figure 3:
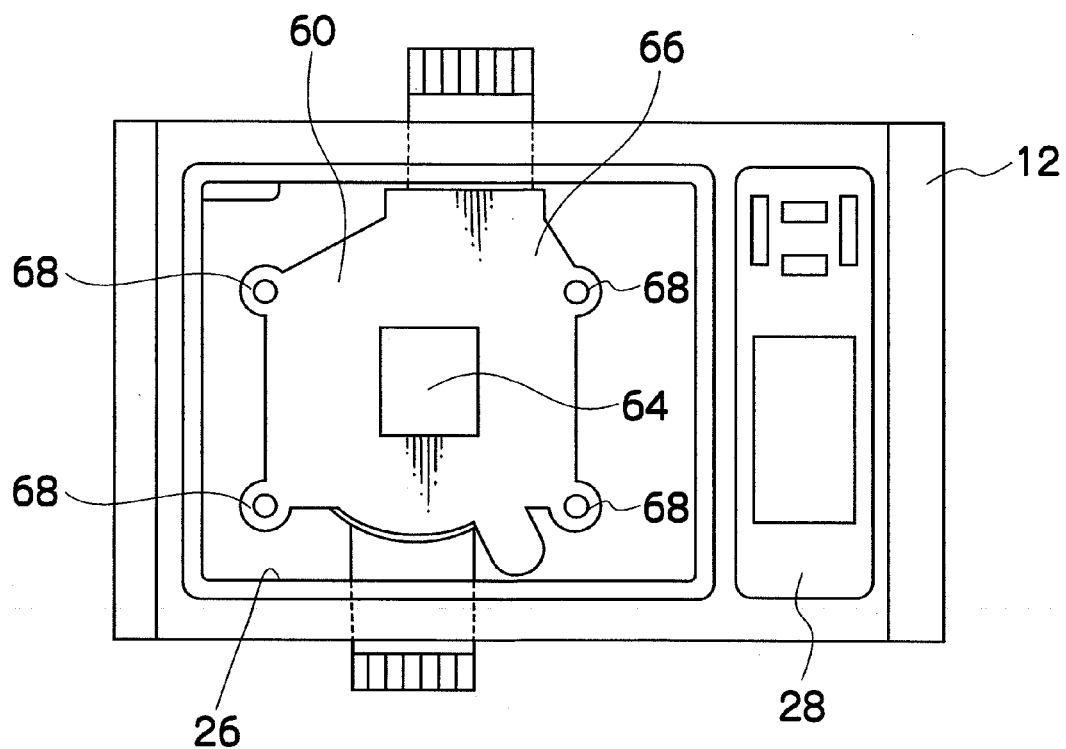
FIG. 3 is a back view of an outer cover body to which a lens unit is attached.

Also, in the camera 10 of the present embodiment, the monitor opening portion 26 is formed facing the lens attachment portion such that the lens unit 60 can be perpendicularly attached with respect to the lens attachment portion formed on the lens ring 70. To be more specific, as shown in FIG. 3, the monitor opening portion 26 is formed such that the lens unit 60 attached to the lens ring 70 can be perpendicularly pulled out with respect to the back surface of the outer cover body 12. In other words, the monitor opening portion 26 is formed such that the entire lens unit 60 (excluding the movable portion such as a flexible cable) can be seen from the monitor opening portion 26 when the lens unit 60 is attached to the lens ring 70 by screwing. Accordingly, the lens unit 60 can be attached to the outer cover body 12 by perpendicularly inserting the lens unit 60 down into the outer cover body 12 from the monitor opening portion 26, and screwing can be also easily performed.

A method of assembling the camera 10 in the present embodiment having the configuration as described above will be described in the following.

First, the lens unit 60 is attached to the outer cover body 12. As shown in FIG. 2, the lens unit 60 is attached by attaching the lens ring 70 to the front surface of the outer cover body 12 and screwing the lens unit 60 to the lens ring 70 by the screws 72.

The lens ring 70 is attached by inserting the four pins 74 formed on the back surface of the lens ring 70 through the lens ring attachment holes 22 formed in the front surface of the outer cover body 12. The lens ring 70 is thereby positioned and attached to a predetermined position. That is, the lens ring 70 is attached on the same axis as the lens opening portion 18 so as to enclose the periphery of the lens opening portion 18.

The lens unit 60 is attached by screwing the screwing portions 68 by the screws 72 to the four pins 74 that are inserted through the lens ring attachment holes 22. The attachment is performed as follows.

First, the lens unit 60 is inserted into the outer cover body 12 from the monitor opening portion 26. As described above, in the camera 10 of the present embodiment, the monitor opening portion 26 is formed larger than the outline of the lens unit 60. Therefore, by perpendicularly inserting the lens unit 60 down from the monitor opening portion 26, the lens unit 60 can be inserted into the outer cover body 12.

When the lens unit 60 is inserted into the outer cover body 12, the positions of the screwing portions 68 of the lens unit 60 and the pins 74 of the lens ring 70 are aligned with each other. The screws 72 are inserted through the screwing portions 68, and the screws 72 are screwed with the screw holes 74a formed in the pins 74. Accordingly, the lens unit 60 and the lens ring 70 are fastened to each other, and the front surface of the outer cover body 12 is held therebetween, so that the lens ring 70 and the lens unit 60 are fixed to a predetermined position. That is, the lens ring 70 and the lens unit 60 are fixed such that the optical axis of the lens unit 60 is located on the same axis as the lens opening portion 18.

In the camera 10 of the present embodiment, the monitor opening portion 26 is formed facing the lens attachment portion formed in the lens ring 70, and the monitor opening portion 26 is formed such that the lens unit 60 attached to the lens ring 70 can be perpendicularly pulled out with respect to the back surface of the outer cover body 12 as shown in FIG. 3. Therefore, the lens unit 60 can be directly attached to the lens ring 70 by perpendicularly inserting the lens unit 60 down from the monitor opening portion 26. Also, the screws 72 can be perpendicularly inserted down from the monitor opening portion 26 to screw the lens unit 60. As described above, in the camera 10 of the present embodiment, the lens unit 60 can be attached by inserting the lens unit 60 down in only one direction, and thus, the lens unit 60 can be very easily attached.

After the lens ring 70 and the lens unit 60 are attached to the outer cover body 12 as described above, the inner frame 46 to which various electronic parts such as the LCD monitor 50, the electronic flash 52 and the substrate are attached is inserted from the top surface opening portion 12A of the outer cover body 12 as shown in FIG. 1.

At this time, the inner frame 46 is inserted into the outer cover body 12 with the top cover 14 being attached to the top surface portion of the inner frame 46. When the inner frame 46 is inserted into the outer cover body 12, the top cover 14 is fitted into the step portion 12a that is formed in the top surface opening portion 12A of the outer cover body 12. The top cover 14 is thereby attached to a predetermined position.

Finally, the bottom cover 16 is attached to the bottom surface opening portion 12B of the outer cover body 12. In order to attach the bottom cover 16, the bottom cover 16 is fitted into the step portion 12b that is formed in the bottom surface opening portion 12B of the outer cover body 12, first. The screws 38 are inserted through the attachment holes 40 formed in the bottom cover 16, and are screwed with the screw holes 42 formed in the inner frame 46. The bottom cover 16 is thereby fixed to the inner frame 46. Also, the outer cover body 12 is thereby held between the bottom cover 16 and the top cover 14, so that the bottom cover 16 and the top cover 14 are fixed to the outer cover body 12.

The assembly of the camera 10 in the present embodiment is completed as described above. The camera 10 assembled as described above does not have a seam (seamless) on the outer periphery of the outer cover body 12, and excellent appearance can be obtained.

The camera 10 in the present embodiment has a configuration in which the lens unit 60 is housed in the outer cover body 12 having a tubular shape not from the both end opening portions (the top surface opening portion 12A and the bottom surface opening portion 12B) but by using the monitor opening portion 26 as described above. Therefore, even when the collapsible lens unit 60 is used, it is not necessary to increase the size of the opening portions beyond necessity, and it is thereby possible to reduce the size and thickness of the camera as much as possible.

Also, in the camera 10 of the present embodiment, the lens unit 60 can be attached by perpendicularly inserting the lens unit 60 down from the monitor opening portion 26. Therefore, the assembly operation can be very easily performed.

Although the monitor opening portion 26 is formed such that the lens unit 60 can be attached by perpendicularly inserting the lens unit 60 down in consideration of ease of assembly in the present embodiment, the monitor opening portion 26 may have a size through which at least the lens unit 60 can pass.

Also, the monitor opening portion 26 does not always have to be formed facing the lens attachment portion, and may be formed in a position where the lens unit 60 can be attached to the lens attachment portion. However, considering ease of assembly, it is preferable to form the monitor opening portion 26 facing the lens attachment portion as in the camera 10 of the present embodiment.

Also, although the lens unit 60 is inserted into the outer cover body 12 by using the monitor opening portion 26 in the present embodiment, the monitor opening portion 26 does not always have to be used, and another opening portion (except the both end opening portions) may be used to insert the lens unit 60.

Also, it is possible to reduce the size and thickness of the camera as much as possible according to the camera in the present embodiment as described above. Therefore, it is preferable to form a width A in the front-back direction of the both end opening portions (the top surface opening portion 12A and the bottom surface opening portion 12B) to be smaller than a width (thickness) B in the front-back direction of the lens unit 60 as shown in FIG. 4. In this case, although the thickness B of the lens unit 60 can be absorbed by increasing the thickness of the outer cover body 12 to increase the entire thickness (width in the front-back direction) D of the outer cover body 12, it is preferable to allow the top end portion of the lens barrel to project a predetermined amount (C) from the front surface of the outer cover body 12, and absorb the projecting amount by the thickness C of the lens ring 70 as in the present embodiment. Accordingly, a predetermined gap E is formed behind the lens unit 60 as shown in FIG. 4, and the LCD monitor 50, the substrate or the like can be easily disposed here. Also, the front surface of the outer cover body 12 can be made to look flat without giving a sense of incongruity.

Figure 5:
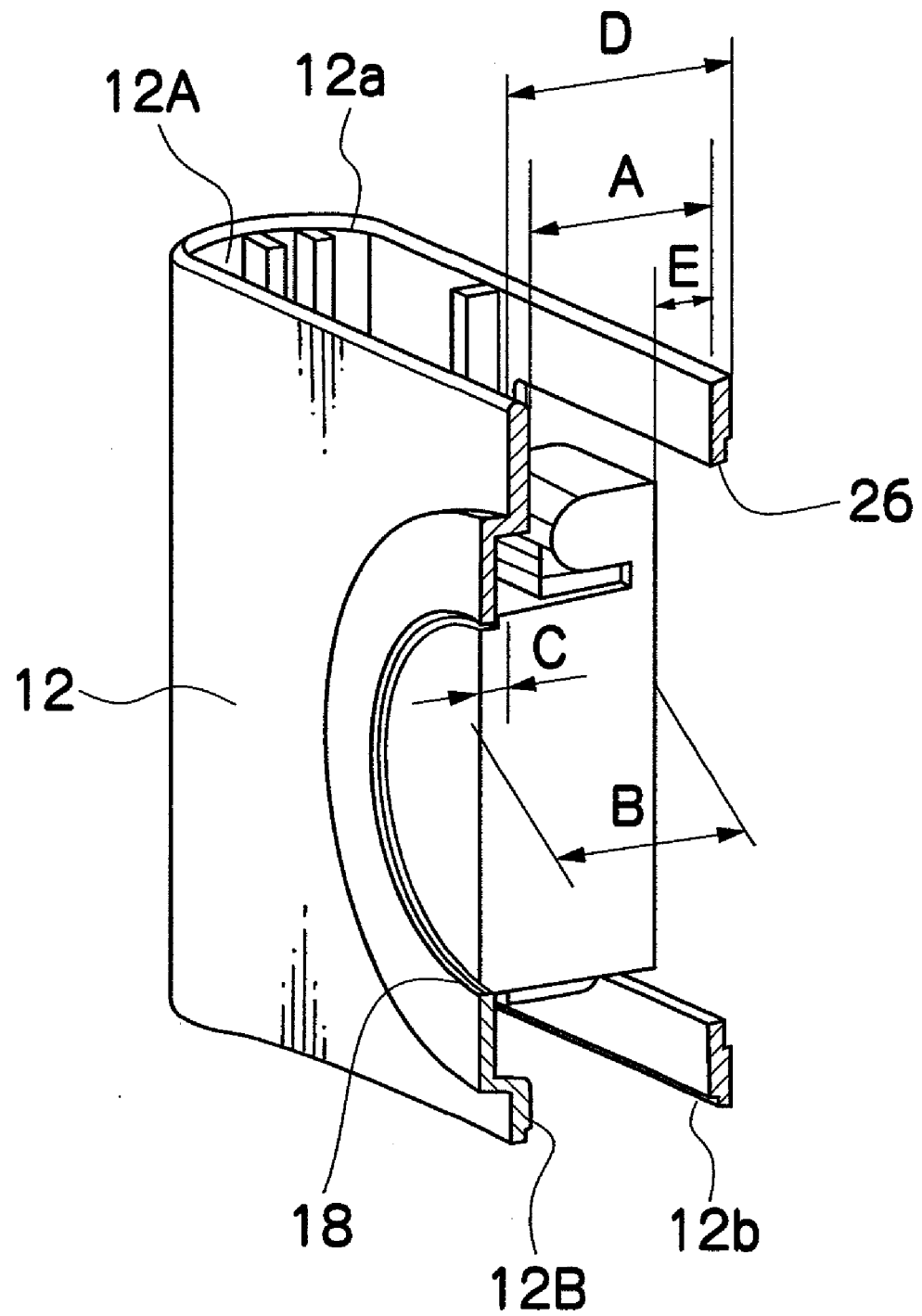
FIG. 5 is a sectional perspective view illustrating another example of an outer cover body.

Although the camera in the present embodiment has a configuration in which the projecting amount of the lens barrel is absorbed by the thickness C of the lens ring 70, the same effect can be also obtained by allowing the periphery of the lens opening portion 18 to project a predetermined amount (C) with a predetermined width as shown in FIG. 5. This type of processing can be performed by half punching the periphery of the lens opening portion 18 after extruding the outer cover body 12, for example. In this case, it is preferable to give decoration such as diamond cut processing, hairline processing, mirror surface processing or the like in order to improve design characteristics of the projecting surface.

Also, although the lens unit 60 is attached to the outer cover body 12 by using the lens ring 70 in the camera of the present embodiment, the method of attaching the lens unit 60 is not limited to the above method, and the lens unit 60 may be directly attached to the outer cover body 12.

Figure 6:
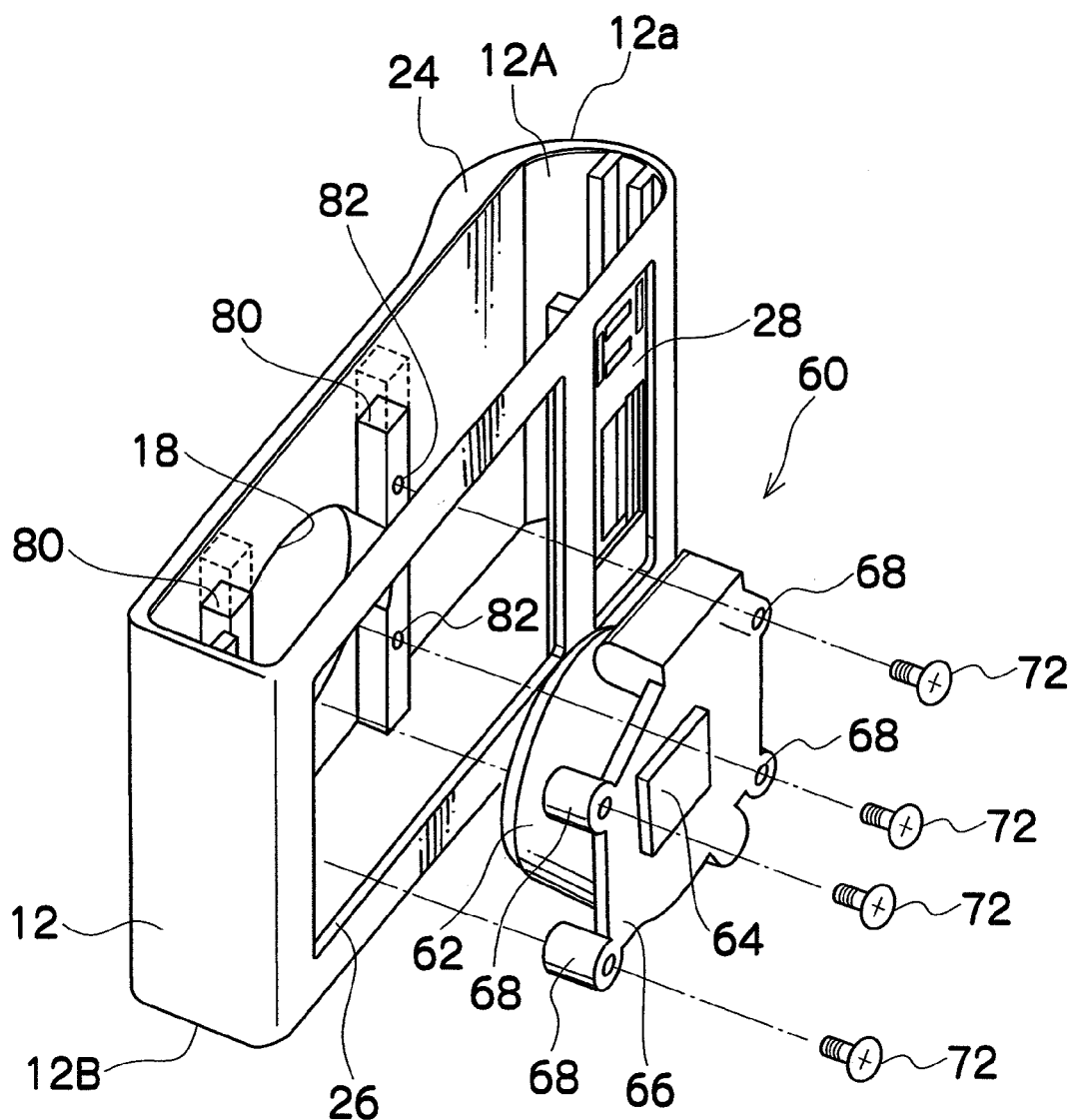
FIG. 6 is a perspective view illustrating another example of attaching a lens unit.

FIG. 6 is a perspective view of a configuration in which the lens unit 60 is directly attached to the outer cover body 12. As shown in FIG. 6, ribs 80 are formed on an inner peripheral portion of the front surface of the outer cover body 12 along the vertical direction as the lens attachment portion (formed at the time of extruding the outer cover body). Screw holes 82 for screwing the lens unit 60 are formed in the ribs 80 corresponding to the screwing portions 68 of the lens unit 60. It is preferable to remove an unnecessary portion of the rib 80 (dashed line portion) by processing by leaving only a necessary portion.

The lens unit 60 is inserted into the outer cover body 12 from the monitor opening portion 26, and the positions of the screwing portions 68 and the screw holes 82 are aligned with each other. After that, the screws 72 are inserted through the screwing portions 68 and are screwed with the screw holes 82, to attach the lens unit 60 to the outer cover body 12.

The configuration in which the lens unit 60 is directly attached to the outer cover body 12 may be employed as described above. In this case, the lens ring is also directly attached to the outer cover body 12, for example, by using an adhesive.

Figure 7:
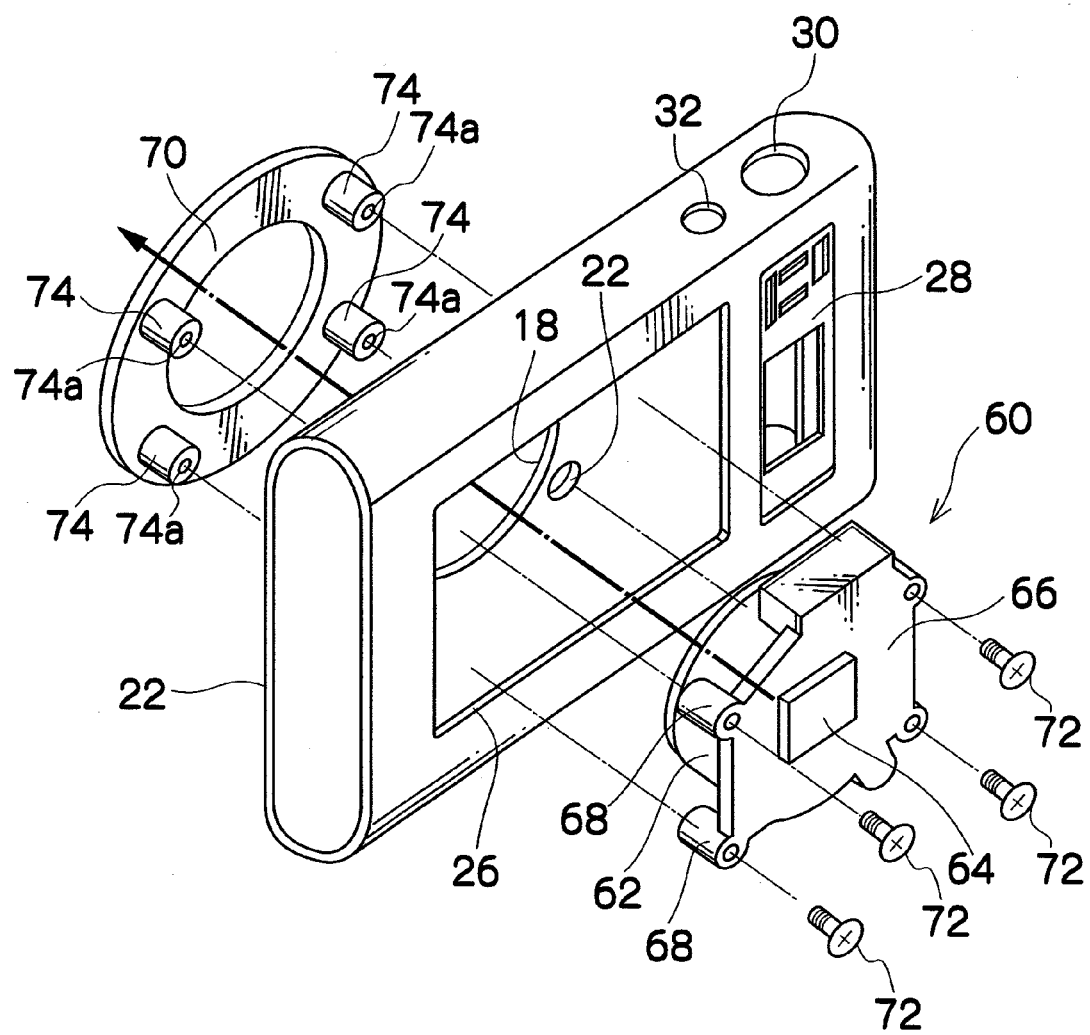
FIG. 7 is a perspective view illustrating another example of an outer cover body.

Also, the camera in the present embodiment is described based on the example in which the lens unit is attached to the outer cover body with the both top and bottom end surfaces being opened (outer cover body extruded in the vertical direction). However, the present invention may be similarly applied to a case in which the lens unit 60 is attached to the outer cover body 12 with the both right and left end surfaces being opened (outer cover body extruded in the horizontal direction) as shown in FIG. 7. In this case, the outer cover body 12 is also configured such that the lens unit 60 can be inserted into the outer cover body 12 from the monitor opening portion 26, and the monitor opening portion 26 is also formed such that the entire lens unit 60 (excluding the movable portion such as a flexible cable) attached to the outer cover body 12 can be seen from the monitor opening portion 26.

Also, although the case in which the collapsible lens unit is attached is described in the present embodiment, the present invention may be similarly applied to a case in which a lens unit using a refractive optical system is attached.

What is claimed is:

1. A camera assembled by attaching a lens unit to inside of a hollow outer cover body that is formed with both top and bottom or right and left end surfaces having openings, the camera comprising:
   a lens attachment portion for attaching the lens unit, which is formed in the outer cover body;
   a lens opening portion formed in the outer cover body, through which a lens barrel of the lens unit attached to the lens attachment portion is inserted;
   a hole formed in a surface of the outer cover body other than the surfaces where the openings are formed, through which the lens unit can pass so that the lens unit is housed inside the outer cover body and is attached to the lens attachment portion;
   wherein a width in a front-back direction of the openings formed in the both top and bottom or right and left end surfaces of the outer cover body is formed smaller than a width in a front-back direction of the lens unit, and the lens unit is attached to the lens attachment portion with a top end portion of the lens barrel projecting from the lens opening portion.

2. The camera according to claim 1, further comprising:
a decorative member attached to an outer peripheral surface of the front surface of the outer cover body; and
a fastening member which fastens the lens unit attached to the lens attachment portion to the decorative member by holding the outer cover body between the lens unit and the decorative member so as to fix the lens unit to the lens attachment portion.

3. The camera according to claim 1, wherein
an outer periphery of the lens opening portion is formed projecting with a predetermined width by half punching.

4. The camera according to claim 1, wherein
the hole is formed in a back surface of the outer cover body, and a monitor is mounted on the hole.

5. The camera according to claim 4, wherein
the hole is formed at least larger than an outer periphery of the lens unit such that the lens unit can be inserted perpendicularly with respect to the back surface of the outer cover body.

6. The camera according to claim 5, wherein
the hole is formed facing the lens attachment portion such that the lens unit attached to the lens attachment portion can be perpendicularly pulled out.

7. The camera according to claim 4, further comprising:
a decorative member attached to an outer peripheral surface of the front surface of the outer cover body; and
a fastening member which fastens the lens unit attached to the lens attachment portion to the decorative member by holding the outer cover body between the lens unit and the decorative member so as to fix the lens unit to the lens attachment portion.

8. The camera according to claim 7, wherein
the decorative member is a lens ring, which is attached to an outer periphery of the lens opening portion.

9. The camera according to claim 8, further comprising:
a lens ring attachment hole formed penetrating the front surface of the outer cover body around the lens opening portion; and
a pin to be inserted through the lens ring attachment hole, which is formed in a back surface of the lens ring, wherein
the lens unit attached to the lens attachment portion is perpendicularly screwed to the pin by a screw and fixed.

10. The camera according to claim 4, wherein
an outer periphery of the lens opening portion is formed projecting with a predetermined width by half punching.

11. The camera according to claim 10, wherein
a surface formed projecting is given surface decoration.

* * * * *